United States Patent [19]

Gray et al.

[11] Patent Number: 5,415,042
[45] Date of Patent: May 16, 1995

[54] MEASURING PROBE

[75] Inventors: Harry Gray, Solihull, England; Barry L. Price, Quorn, United Kingdom

[73] Assignee: British Gas plc, London, England

[21] Appl. No.: 39,446

[22] PCT Filed: Nov. 8, 1991

[86] PCT No.: PCT/GB91/01971
§ 371 Date: Apr. 22, 1993
§ 102(e) Date: Apr. 22, 1993

[87] PCT Pub. No.: WO92/09868
PCT Pub. Date: Jun. 11, 1992

[30] Foreign Application Priority Data

Nov. 29, 1990 [GB] United Kingdom ............... 9025948

[51] Int. Cl.⁶ .......................................... G01F 23/24
[52] U.S. Cl. ................................................ 73/304 R
[58] Field of Search ..................... 73/304 R; 340/620

[56] References Cited

U.S. PATENT DOCUMENTS

| 1,978,392 | 10/1934 | Brockdorff | 73/304 R |
| 2,498,232 | 2/1950 | Andrews | 73/304 R |
| 4,382,382 | 5/1983 | Wang | 73/304 R |
| 4,383,544 | 5/1983 | Vosper | 137/94 |
| 4,465,088 | 8/1984 | Vosper | 137/1 |

FOREIGN PATENT DOCUMENTS

| 539170 | 12/1955 | Belgium . |
| 0281272 | 9/1988 | European Pat. Off. ..... G01F 23/24 |
| 0367868 | 5/1990 | European Pat. Off. . |
| 0399824 | 11/1990 | European Pat. Off. . |
| 1473193 | 4/1969 | Germany . |
| 3446060 | 6/1986 | Germany . |
| 814523 | 6/1959 | United Kingdom . |
| 2086056 | 5/1982 | United Kingdom . |

OTHER PUBLICATIONS

Roughton, J. E., E. A. "Electromechanical Transducers in Hostile Environments", *IEE Reviews*, vol. 126, No. 11R, Nov. 1979, pp. 1029–1052.

Edwards, R. W., "Low Coolant Sensing Probe With Connector Corrosion Prevention", *Research Disclosure*, No. 288, Apr. 1988, Havant GB, p. 243.

*Primary Examiner*—William A. Cuchlinski, Jr.
*Assistant Examiner*—Willie Morris Worth
*Attorney, Agent, or Firm*—Larson and Taylor

[57] ABSTRACT

A measuring probe to detect the presence of electrically conducting liquid or granular material includes a first metal electrode (4) comprising a tube (5) which is adhered to a porous, ceramic insulator (12) adhered in turn to a skirt (10) forming a second metal electrode (6). First electrode (4) is connected to a gas supply (58) supplying gas, for example nitrogen, under pressure which emerges into a space (26) in the probe and which then passes through insulator (12) to emerge from face (20) thereof. A heat resistant cable (46) has its conductor (52) brazed to cap portion (8) of second electrode (6). Cable (46) and first electrode (4) are connected into an electrical circuit (66) in which current flows when a conducting bridge of granular material simultaneously contacts both electrodes (4 and 6). Should the level of the granular material drop below second electrode (6), gas emerging from face (20) blows away any granular material trying to preserve the conducting bridge, and circuit (66) is interrupted.

13 Claims, 2 Drawing Sheets

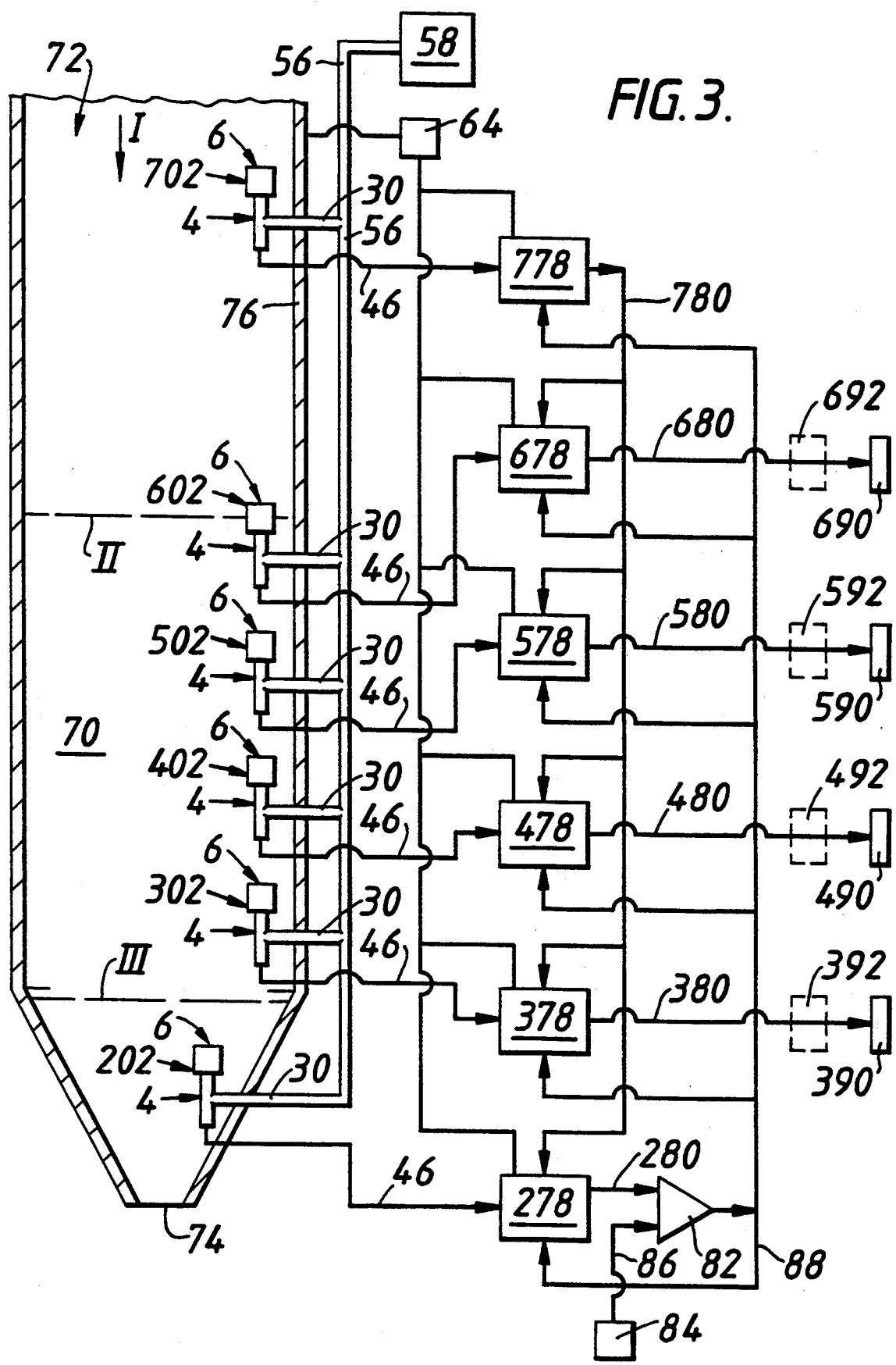

MEASURING PROBE

FIELD OF THE INVENTION

This invention concerns a measuring probe to detect the presence at the site of the probe of electrically conducting material in granular or liquid form.

SUMMARY OF THE INVENTION

The probe can be used to provide an electrical signal to indicate that electrically conducting material in granular or liquid form is at least present at the level of the probe. Such a signal can be used as an indication of how much granular or liquid material is in a container in which the probe is disposed at a given height above a lower part of the container.

According to the invention a measuring probe to detect the presence at the site of the probe of electrically conducting material in granular or liquid form comprises a first electrode and a second electrode spaced from said first electrode, and means whereby the first and second electrodes can be connected to a supply of electrical energy so that when a space between said electrodes is electrically bridged by the electrically conducting material an electrical circuit through the probe is completed, characterised by said first electrode being spaced from said second electrode by electrically insulating porous gas permeable material, and means whereby gas can be propelled through said gas permeable material between the electrodes outwardly from the probe to pass through said space.

In the event of a bulk volume of electrically conducting granular material dropping below the level of the probe, that bulk volume may leave behind it threads or lumps of adhering granular material also sticking to both the electrodes to provide an electrically conducting residual bridge therebetween. The existence of such a residual bridge may result in a spurious signal appearing in an electrical circuit connected to the electrodes to wrongly indicate that the bulk of the material is still level with the probe. Flow of gas from the probe can be of sufficient force to blow away any such residual bridges, and thus the probe can be self-cleaning. In the case where the probe is being used to detect the presence or otherwise of electrically conducting liquid at the level of the probe then should the level of the liquid drop below the electrodes the outflow of gas from the probe can blow away or dry off any liquid remaining at the space between the electrodes thereby causing a liquid formed conducting path between the electrodes to vanish.

BRIEF DESCRIPTION OF THE DRAWINGS

The invention will now be further described, by way of example, with reference to the accompanying drawings in which:

FIG. 3 shows a possible arrangement, in use, of a plurality of probes, each as shown in FIG. 1, in combination with a supply of gas and an electronic indication circuit.

DETAILED DESCRIPTION OF THE PREFERRED EMBODIMENTS

Figure 1:
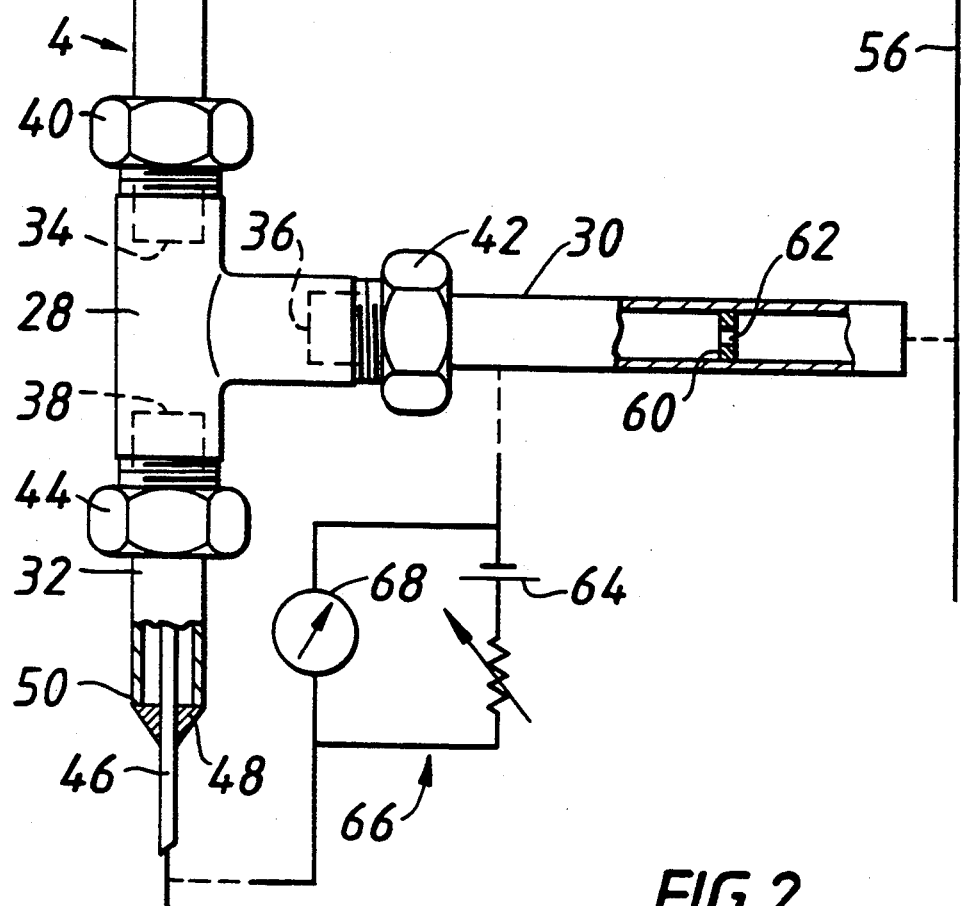
FIG. 1 is a side view, partly in section, of a measuring probe formed according to the invention, in combination with a supply of gas shown diagrammatically and an electrical circuit.

With reference to FIG. 1, a heat resistant measuring probe 2 comprises an electrode 4 comprising a tube 5 of circular cross-section about which extends a concentric, cylindrical electrode 6. These electrodes 4,6 may be of any suitable heat resistant, electrically conducting material, for example, stainless steel. The electrode 6 is disposed as an inverted cup formed by a substantially flat cap portion 8 from which depends an annular skirt 10. The two electrodes 4,6 are spaced one from the other by a heat resistant, electrically insulating spacer 12 which is preferably mechanically strong. The spacer 12 may be of ceramic material. A possible ceramic material for the insulating space 12 is "SCHUMALITH SC" Filter Candle, Grade 5 available from Schumacher Filters Ltd. of Parkway Industrial Estate, Sheffield, England. The spacer 12 is of substantially cylindrical shape having its circumferential surface 14 attached to the inner surface of the skirt 10 by, for example, heat resistant adhesive. Electrode 4 is disposed in an axial bore 16 in the spacer 12 and is attached thereto, also, for example, by heat resistant adhesive. The material forming the spacer 12 is a porous gas permeable material defining a plurality of inter-communicating cells or cavities thus forming passages which allow the flow of gas through the spacer from one end 18 thereof to its opposite end 20. Spacer end face 18 is shown flush with an end 22 of the tube 5 but need not be so, and a lower end 24 of the skirt 10 is shown flush with spacer end face 20, but again need not be so. End face 18 of the spacer 12 is spaced from an inner surface of cap portion 8 to leave a short cylindrical gap 26 within the electrode 6. The electrode 4 further comprises a T-junction 28 and tubes 30 and 32. Ends 34,36 and 38 of the tubes are secured to the limbs of the T-junction by gas-tight compression joints comprising electrically conducting olives (compression fittings) clamped in place by nuts 40,42 and 44.

The tube 5, electrode 6 and the spacer 12 may have other than circular cross-sectional shapes.

A heat resistant electric cable 46, for example "PYROTENAX" cable, extends with good clearance through the tube 5 and T-junction 28. The cable 46 has a heat resistant outer sheath of, for example, stainless steel attached in a gas-tight heat resistant joint 48 to end 50 of the tube 32. Joint 48 can be a brazed joint. Within the electrode 6, a central electrical conductor 52 emerges from the cable sheath and is brazed at 54 to the electrode cap portion 8. Between its outer sheath and its central conductor the cable 46 comprises mineral insulation, for example magnesium oxide.

Figure 2:
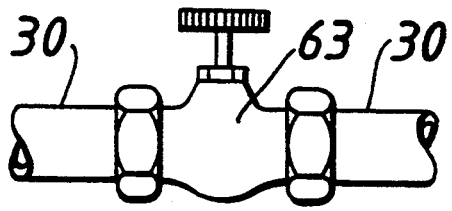
FIG. 2 shows a modification which can be made to the probe in FIG. 1.

When the probe 2 is in use the tube 30 is connected by piping 56 to a supply of gas 58 from which any suitable gas is supplied at a pressure exceeding that of the particular ambient atmosphere surrounding the electrodes 6 and 4. Thus the gas from supply 58 flows along the tube 30 and through the T-junction 28 and tube 5 into the space 26 from which the gas passes through the porous spacer 12 to emerge at the end face 20. The gas emerging from the spacer 12 does so under pressure so that it exhibits a blowing effect at and in the vicinity of the end face. 20. The gas pressure prevailing in the space 26 can have a value which is a pre-determined amount above the pressure of the ambient atmosphere surrounding the electrode 6. The pressure difference between the space 26 and the ambient atmosphere around electrode 6 may be about 20 p.s.i. (about 1.4 Kg/cm$^2$). To ensure that a pre-determined pressure difference exists between space 26 and the ambient atmosphere surrounding electrode 6 not only is the output pressure of gas supply 58 controlled to a pre-determined value but means may be provided in the probe 2 to provide the pre-determined pressure difference, for example gas flow restrictor means may be provided in the probe to provide a pre-determined pressure drop across the restrictor means. In FIG. 1 the restrictor means is shown in the form of a plate 60 with an orifice 62 in the tube 30. In FIG. 2 the restrictor means takes the form of an ajustable gas flow control valve 63 inserted between two sections of the pipe 30.

As an alternative to the gas flow restrictor means, for example the plate 60 or valve 63, or in addition to said restrictor means, the gas permeability or the porosity of the insulating spacer 12 can be selected to provide the predetermined pressure difference between the end faces 18 and 20 of the spacer 12. Preferably the permeability of the insulating spacer 12 is such that the gas flow emerging from the end face 20 is substantially uniform over substantially the whole area of the face 20.

Gas supply 58 may be, for example, a supply of nitrogen gas. The supply of gas to the probe 2 can be continuous. An electrical energy supply is also connected to the probe 2. This supply may be a D.C. supply 64 of which one pole is connected to the conductor 52 of the cable 46 and the other pole of which is connected to the electrode 4, the connection to the electrode 4 being shown at the tube 30 by way of example.

In order to detect the presence of electrically conducting material in flowable granular form the probe is placed in a position where the granular material can gather in such quantity as to simultaneously contact and submerge at least part of the electrode 6 and at least part of the electrode 4. When this occurs the granular material forms a conducting bridge between electrode 6 and the electode 4 thus completing circuit 66 in which detecting means 68, for example a voltmeter, gives an indication that the circuit is complete. This signifies that, in the vicinity of the probe 2, the granular material is at least at the level of end 24 of electrode 6 above a datum level, which is a measure of how much granular material there is above the datum. Should some of the flowable granular material be removed so that the amount left occupies a volume commensurate with the level of the material being lower than the electrode end 24, the gas continuously blowing from the spacer 12 through its face 20 blows off any structures or threads of adhering granular material which might tend to remain to bridge the gap between electrode 6 and the electrode 4. This interrupts circuit 66 so that detector means 68 registers that the level of the granular material, which might still be in the vicinity of the probe 2, is now below the electrode end 24. Accordingly the continuously emitted gas from the probe 2 acts as a flushing fluid to prevent the probe giving a spurious signal that the amount of granular material in the vicinity of the probe is greater than it actually is.

Should the probe 2 be used to measure the level of an electrically conducting liquid, the continuously emitted gas will blow away or dry off liquid clinging to the spacer face 20, when the liquid level drops below the electrode end 24, and thus cause a conducting path between the electrodes 4 and 6 to vanish.

To indicate where the level of a quantity of granular material or a liquid is between vertically spaced upper and lower limits a plurality of probes 2 can be used each at a different vertical level in the vertical distance between the limits.

A number of probes 2 are used in the apparatus shown in FIG. 3 to measure the level of char build up in a lower part 70 of an upright tubular apparatus or hydrogenator 72 having an upper part in which small particles of coal are hydrogenated or reacted in an atmosphere of hydrogen to form methane, and the spent coal falls as granules of char in direction I to collect as a flowable mass of char granules in lower part 70 from which the char leaves through opening 74. In this case the gas supplied to the probes from the supply 58 may be hydrogen.

In FIG. 3 the probes are indicated by the reference numerals 202,302,402,502,602 and 702. In the hydrogenator these probes are subjected to a high temperature, for example several hundred degrees centrigade. The tubes 30 of the probes are in electrically conducting contact with electrically conducting material forming a wall portion 76 of the apparatus 72. The cables 46 from the respective probes 202,302,402,502,602 and 702 are inputs to respective amplifiers 278,378,478,578,678 and 778. All these amplifiers are substantially similar. A suitable power supply 64, for example a D.C. supply, is electrically connected to the amplifiers and also to the conducting material forming the wall portion 76 to provide the circuit including the probes. When electrically conducting char bridges the space between the two electrodes 4,6 of any probe an electric current flows through that probe providing an electrical signal on the corresponding line 46 as an input to the corresponding amplifier,278,378,478,578, 678 or 778.

The four probes 302,402,502 and 602 are positioned to measure char accumulation in the lower part 70 of the hydrogenator, and depending on the extent of such accumulation the char level is somewhere between upper and lower limits II and III respectively, so that on occasion none of these four probes is submerged in char and at other times one or more are submerged. Since probe 202 is positioned below the lowest char level III, the probe 202 is always submerged in char which forms a continuous conducting bridge between the electrodes of that probe. Thus the electrical signal on line 46 from probe 202 (which is a conducting material reference probe) is always of a value corresponding to char being present at the probe. The electrical signal from probe 202 is input to amplifier 278 where it is amplified and the amplified signal supplied as an input on line 280 to comparing means 82. The comparing means 82 may be a difference amplifier. A reference signal generator 84 provides a reference signal of pre-determined value on input line 86 to the comparing means 82. The comparing means 82 compares the amplified signal on input 280 with the reference signal, and if they differ the comparing means issues on line 88 a gain control signal which is a function of the difference in the signals on lines 280 and 86. The gain control signal on line 88 varies the gain of amplifier 278 to make the amplified signal on line 280 equal to the reference signal on line 86 so that the signal on line 88 varies to a value which no longer varies the gain of amplifier 278. The gain control signal on line 88 is also supplied to the amplifiers 378,478,578,678 and 778 to control the gain thereof so that each of those amplifiers has the same gain as the amplifier 278.

The purpose of ensuring that all the amplifiers have the same gain is to ensure that the signal on a line 46 from any probe 302,402,502 or 602 is recognised as being either due to no char bridging the electrodes of the probe or due to char contacting the electrodes simultaneously. Char can have a very high electrical resistance and thus a low conductivity so that even when char is contacting both the electrodes of a particular probe simultaneously, the electrical signal on the respective line 46 is likely to be weak and difficult to distinguish from a signal when the electrodes are not bridged by char. But it is known that probe 202 is always in char, so that the value of the amplified output on line 280 indicates the value of a signal which indicates that char is at the level of a probe. Thus when the amplified signal on an output line 380,480,580 or 680 substantially equals that on output line 280, this indicates that the char is at the level of the respective probe 302,402,502 or 602.

The probes in the hydrogenator are subjected to high temperature. This can cause some reduction in the insulation resistance between the cable conductor 52 and the electrode 4. Therefore the signal on the line 46 from probe 302,402,502 or 602 can be unduly high erroneously indicating that char is level with the probe concerned. Since probe 702 is never submerged by char any signal on line 46 from that probe is taken as being due to a reduction in insulation resistance as aforesaid. It is assumed that there will be a similar reduction in insulation resistance in probes 202,302,402,502 and 602 and thus if there is a reduction in insulation resistance in probe 702 (which is an error reference signal probe) the signal on line 46 therefrom has an electrical value constituting a component of the electrical value of the signal on a said line 46 from any of the other probes. To eliminate the amplified value of that component the output on line 780 from the amplifier 778 is subtracted in the other amplifiers from the amplified values of the signals on the lines 46 from the probes 202,302,402,502 and 602 so that the outputs on lines 280,380,480,580 and 680 are indicative of whether or not the corresponding probes are in char, which is known to be definitely so for the probe 202. Therefore the value of the signal on line 780 from amplifier 778 provides a reference zero or datum point when subtracted in the other amplifiers. Should the value of the signal on line 380,480,580 or 680 be substantially different from that on line 280, for example well below the value on line 280, this indicates that char is not level with the respective probe 302,402,502 or 602. On the other hand if the value of the signal on line 380,480,580 or 680 is near to the value of the signal on line 280 this indicates that char has reached the respective probe and the signal can cause actuation of indicator means 390,490,590 or 690 respectively, to show that char is at least level with the respective probe 302,402,502 or 602. The indicator means can be a plurality of lamps each of which light upon actuation and/or the indicator means may form an analogue or digital or other display or otherwise provide some visual record. If desired signal level detection means 392,492,592 and 692 can be provided in each output line 380,480,580 and 680 to block actuation of any indicator means 390,490,590 or 690 if the value of the signal on line 380,480,580 or 680 respectively is below a pre-determined value, for example say about 40% or 50% of the value of the reference signal on line 86. By ensuring that each indicator means 390,490,590 or 690 is only actuated provided the signal on the respective line 380,480,580 or 680 is above a pre-determined value reduces the chance of a spurious indication that the char is at least at the level of a particular probe 302,402,502 or 602 when it is not.

The pressure within the hydrogenator 72 can be P Kg/cm$^2$ (where P is any suitable number), in which case the gas, for example hydrogen or nitrogen, supplied continuously to the probes from the supply 58 is in the space 26 (FIG. 1) in each probe, at a pressure of substantially (P+1.4) Kg/cm$^2$. The continuous flow of gas through the probes has a cooling effect thereon particularly on the cables 46, which reduces the chance of or mitigates the extent of a reduction of the insulation resistance.

We claim:

1. A measuring probe for detecting a presence at a site of the measuring probe of an electrically conducting fluid material, said measuring probe comprising:

a first electrode having a first end and a second end opposite to said first end;

a second electrode surrounding and spaced from said first electrode by a volume, said second electrode having a first end, wherein said first end of said first electrode extends externally beyond said first end of said second electrode, a second end opposite to said first end of said second electrode wherein said second end of said first electrode is within said second electrode, and a cap portion at said second end of said second electrode covering said second end of said first electrode;

a spacer means in said volume which is formed of electrically insulating porous gas permeable ceramic material defining a plurality of inter-communicating cavities forming passages which allow a flow of gas through said spacer means from a first end of said spacer means to an opposite second end of said spacer means, wherein said second end of said spacer means is within said second electrode, and said second end of said spacer means has an end face substantially at said first end of said second electrode and surrounding said first electrode;

a connecting means for connecting said first and second electrodes to a supply of electrical energy whereby when a distance between said first and second electrodes is electrically bridged by the electrically conducting fluid material an electric circuit is completed; and a gas means for propelling a gas from said first end of said spacer means and through said cavities of said ceramic material so that said gas emerges over substantially all of said end face.

2. A measuring probe according to claim 1, wherein the ceramic material of said spacer means is heat resistant.

3. A measuring probe according to claim 1, wherein said first and second electrodes are heat resistant.

4. A measuring probe according to claim 1, wherein said first electrode comprises a tube, and wherein said gas means directs the gas through said tube to said first end of said spacer means in said second electrode for subsequent passage through said ceramic material.

5. A measuring probe according to claim 4, wherein said second electrode surrounds a space bounded at least in part by said ceramic material, and wherein said tube opens into said space.

6. A measuring probe according to claim 4, wherein an electrical cable extends along said tube and is electrically connected to said second electrode.

7. A measuring probe according to claim 6, wherein said cable is a heat resistant cable.

8. A measuring probe according to claim 1, wherein said electrodes are formed of stainless steel.

9. A system for determining a level of an electrically conducting fluid material in a container comprising:

a plurality of measuring probes mounted at different levels within the container, each said measuring probe comprising (a) a first electrode having a first end and a second end opposite to said first end;

(b) a second electrode surrounding and spaced from said first electrode by a volume, said second electrode having a first end, wherein said first end of said first electrode extends externally beyond said first end of said second electrode, a second end opposite to said first end of said second electrode wherein said second end of said first electrode is within said second electrode, and a cap portion at said second end of said second electrode covering said second end of said first electrode;

(c) a spacer means in said volume which is formed of electrically insulating porous gas permeable ceramic material defining a plurality of intercommunicating cavities forming passages which allow a flow of gas through said spacer means from a first end of said spacer means to an opposite second end of said spacer means, wherein said second end of said spacer means is within said second electrode, and said second end of said spacer means has an end face substantially at said first end of said second electrode and surrounding said first electrode; and (d) a connecting means for connecting said first and second electrodes to a supply of electrical energy whereby when a distance between said first and second electrodes is electrically bridged by the electrically conducting fluid material an electric circuit through the respective said measuring probe is completed;

a gas means for propelling, for each of said measuring probes, a gas from said first end of said spacer means of said measuring probe through said cavities of said ceramic material so that said gas emerges from said measuring probe over substantially all of said end face; and indicating means responsive to the completion or of the electrical circuit through each of said measuring probes for indicating the presence of the fluid material at each said measuring probe.

10. The system according to claim 9, wherein said container includes a lower datum level below which the level of the conducting material in the container is not intended to fall during normal use of said measuring probes;

wherein one of said measuring probes is a reference measuring probe mounted in said container below the lower datum level whereby said reference measuring probe is always submerged in the conducting material during normal use;

and wherein the indicating means comprises (a) a respective amplifier means connected to each of said measuring probes for amplifying an electrical signal produced by current passing through the material bridging the distance between said electrodes and for producing an output signal to an indicating element for each said respective measuring probe;

(b) a comparing means for comparing the output signal from said reference measuring probe with a reference signal and for producing a gain control signal which is a function of a difference between said reference output signal and said reference signal; and (c) an applying means for applying said gain control signal to each said amplifier means for varying a gain of each of said amplifier means.

11. The system claimed in claim 10, wherein others of said plurality of said measuring probes are mounted below an upper datum level above which the level of the conducting material in the container is not intended to rise during normal use of said measuring probes;

wherein another of said plurality of said measuring probes is an error reference signal measuring probe mounted in the container above the upper datum level whereby said error reference measuring probe is never submerged in said conducting material during said normal use;

and further including a modifying means for modifying each output signal from each of said amplifier means to which respective said measuring probes including said reference measuring probe are respectively connected with an amplified output signal derived from the respective said amplifier means connected to said error reference signal measuring probe.

12. The system according to claim 11, wherein said amplified output signal derived from said error reference signal measuring probe is subtracted from each amplified signal derived from each respective said measuring probe by said modifying means.

13. The system according to claim 11, wherein said electrically conducting fluid material is a granular char material produced by reacting coal in a hydrogenation apparatus.

* * * * *